United States Patent

Xiao

(10) Patent No.: US 10,705,660 B2
(45) Date of Patent: Jul. 7, 2020

(54) TOUCH SENSOR, TOUCH DETECTION DEVICE AND DETECTION METHOD, AND TOUCH CONTROL APPARATUS

(71) Applicant: SHENZHEN GOODIX TECHNOLOGY CO., LTD., Shenzhen, Guangdong (CN)

(72) Inventor: Yu Xiao, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 280 days.

(21) Appl. No.: 15/695,200

(22) Filed: Sep. 5, 2017

(65) Prior Publication Data

US 2017/0364183 A1 Dec. 21, 2017

Related U.S. Application Data

(63) Continuation of application No. PCT/CN2016/085999, filed on Jun. 16, 2016.

(51) Int. Cl.
G06F 3/041 (2006.01)
G06F 3/044 (2006.01)

(52) U.S. Cl.
CPC ........... G06F 3/044 (2013.01); G06F 3/0412 (2013.01); G06F 3/0416 (2013.01)

(58) Field of Classification Search
CPC .......... G06F 3/041; G06F 3/044; G06F 3/045; G06F 3/047; G06F 3/048; G06F 3/0484;
(Continued)

(56) References Cited

U.S. PATENT DOCUMENTS 5,942,733 A * 8/1999 Allen .................. G06F 3/044
178/18.01
5,945,980 A * 8/1999 Moissev ............... G06F 3/044
178/18.01

(Continued)

FOREIGN PATENT DOCUMENTS

CN 103927065 A 7/2014
CN 104423740 A 3/2015
(Continued)

OTHER PUBLICATIONS

Extended European Search Report for European Patent Application No. 16891891 dated May 16, 2018.

*Primary Examiner* — Chanh D Nguyen
*Assistant Examiner* — Nguyen H Truong
(74) *Attorney, Agent, or Firm* — Heslin Rothenberg Farley & Mesiti P.C.

(57) ABSTRACT

A touch sensor, a touch detection device and a detection method, and a touch control apparatus are provided. The touch sensor comprises a first electrode layer, a rigid insulating layer, a second electrode layer, a compressible layer, and a third electrode layer disposed successively The compressible layer may change the distance between the second electrode layer and the third electrode layer when subjected to a touch pressure. The second electrode layer and the third electrode layer may form a capacitor structure, and the capacitance value of the capacitor structure may vary with the distance between the second electrode layer and the third electrode layer. The pressure information of a user's touch operation can be calculated from the change of the capacitance value.

11 Claims, 12 Drawing Sheets

(58) Field of Classification Search
CPC .... G06F 3/0488; G06F 3/0482; G06F 3/0481; G06F 3/0486; G06F 3/0485; G02F 1/133; G02F 1/1333; G02F 1/1335; G02F 1/1343; G02F 1/1368; G02F 1/1362; G02F 1/1369; G09G 5/00
See application file for complete search history.

(56) References Cited

U.S. PATENT DOCUMENTS

| | | | | |
|---|---|---|---|---|
| 6,002,389 | A * | 12/1999 | Kasser | G06F 3/044 |
| | | | | 345/173 |
| 2014/0204287 | A1* | 7/2014 | Jiang | G02F 1/13338 |
| | | | | 349/12 |
| 2015/0130742 | A1 | 5/2015 | Chen et al. | |
| 2016/0098110 | A1* | 4/2016 | Choi | G06F 3/0416 |
| | | | | 345/173 |
| 2016/0098131 | A1 | 4/2016 | Ogata et al. | |
| 2016/0357320 | A1* | 12/2016 | Ito | G06F 3/0416 |
| 2017/0090637 | A1* | 3/2017 | Yoon | G06F 3/0414 |
| 2017/0262112 | A1* | 9/2017 | Noguchi | G06F 3/044 |
| 2017/0277328 | A1* | 9/2017 | Kurasawa | G06F 3/0412 |
| 2017/0322657 | A1* | 11/2017 | Wang | G06F 3/0414 |
| 2018/0113343 | A1* | 4/2018 | Huang | G02F 1/133308 |

FOREIGN PATENT DOCUMENTS

| | | |
|---|---|---|
| CN | 105051659 A | 11/2015 |
| CN | 105549790 A | 5/2016 |
| CN | 205230007 U | 5/2016 |
| WO | 2016033219 A1 | 3/2016 |

\* cited by examiner

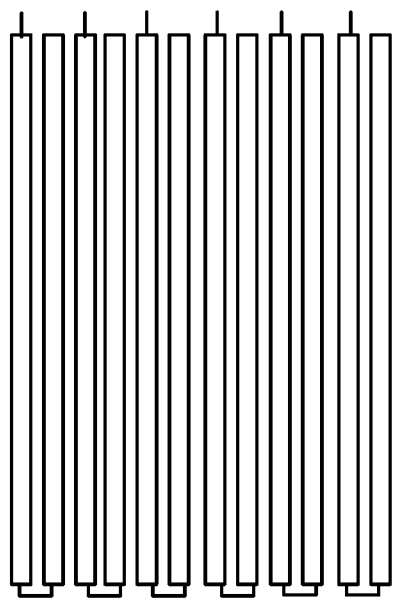
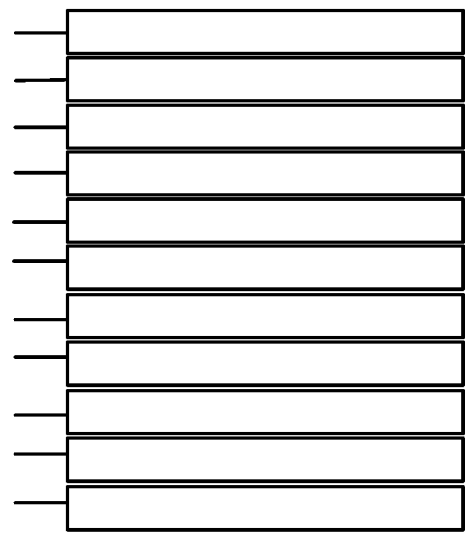
Fig. 9A                Fig. 9B
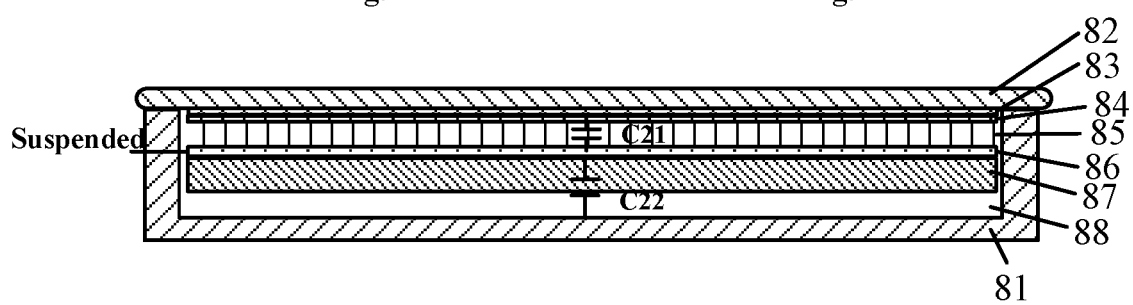
Fig. 10A
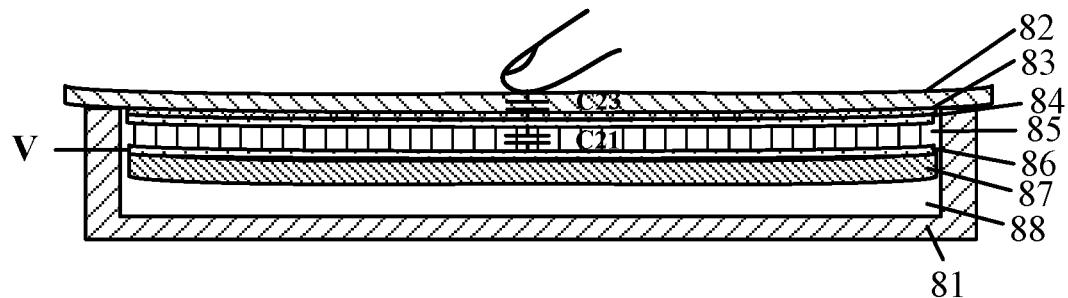
Fig. 10B

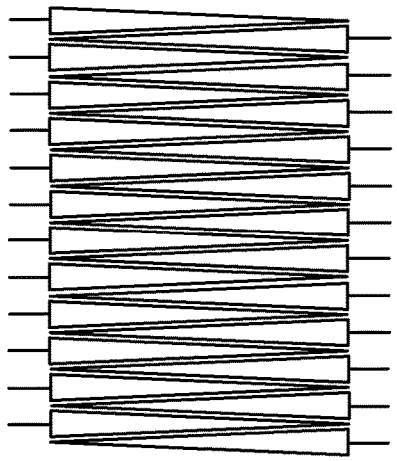
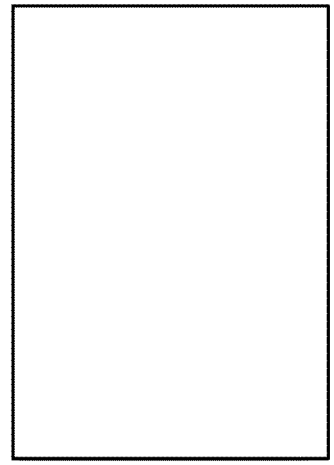
Fig.15A    Fig.15B
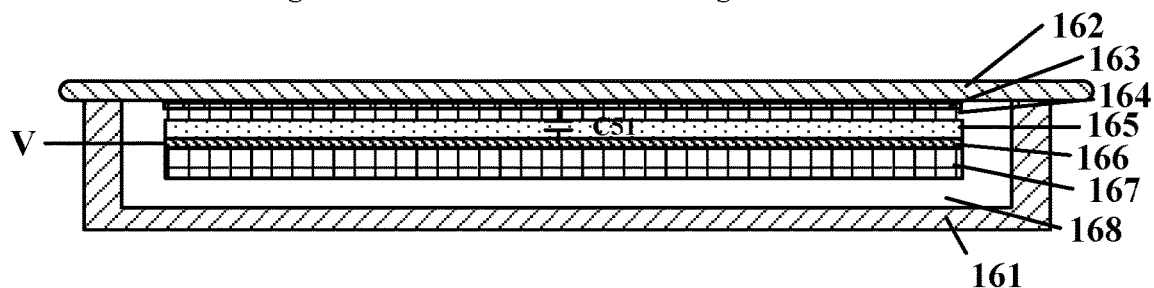
Fig.16A
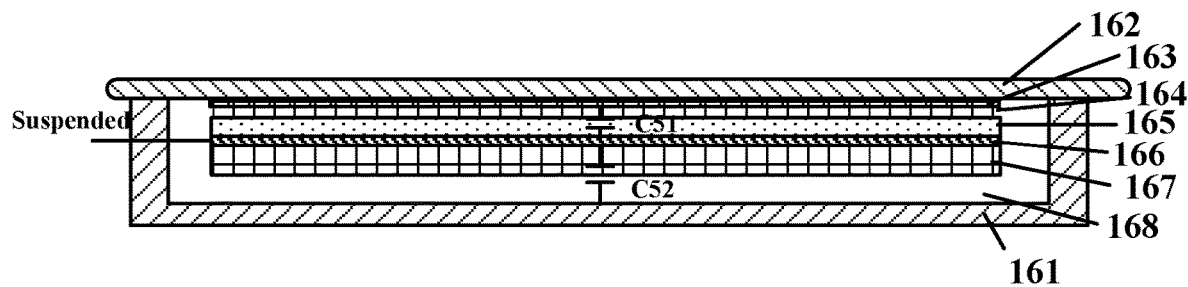
Fig.16B

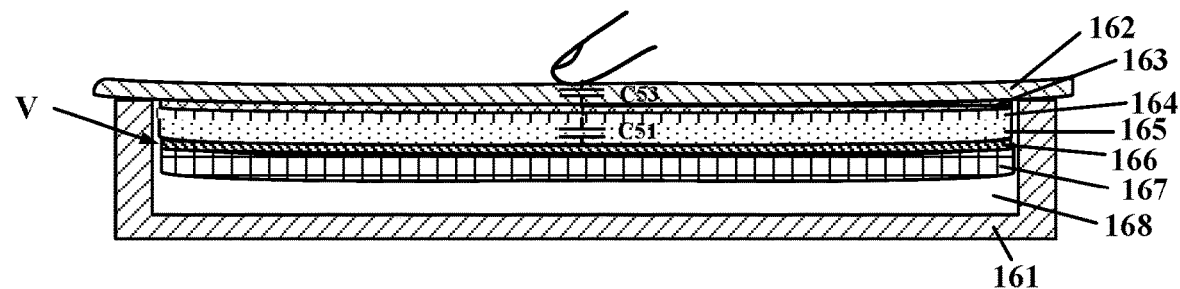
Fig. 16C
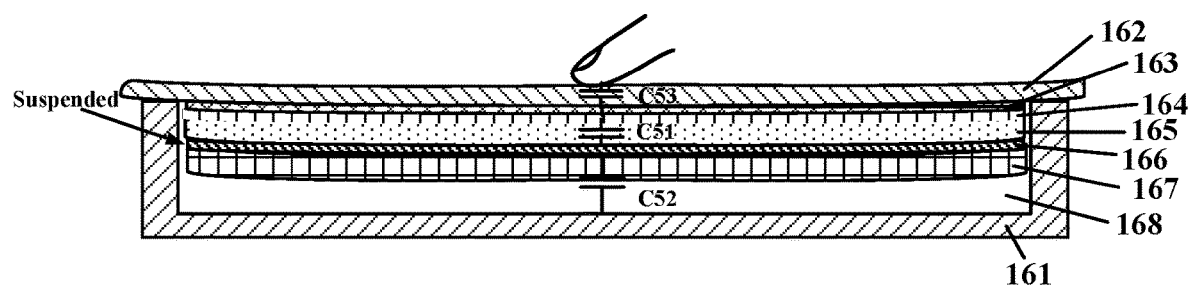
Fig. 16D
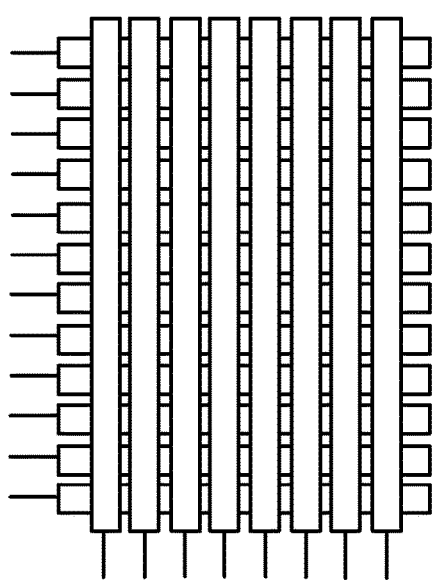 
Fig. 17A  Fig. 17B

TOUCH SENSOR, TOUCH DETECTION DEVICE AND DETECTION METHOD, AND TOUCH CONTROL APPARATUS

CROSS-REFERENCE TO RELATED APPLICATIONS

The present application is a continuation of international application No. PCT/CN2016/085999 filed on Jun. 16, 2016, which is hereby incorporated by reference in its entireties.

TECHNICAL FIELD

The present disclosure relates to the technical field of touch control technology, and in particular, a touch sensor, a touch detection device and detection method and a touch control apparatus.

BACKGROUND

Due to its convenience and intuition for input, touch control technology has been widely used in a variety of electronic apparatus, such as a touch panel of a laptop, touch screens of a tablet computer and a smart phone, etc. The principle of the touch control technology is to identify a specific touch position of the touch operation by using a touch position detection mechanism, and make a response to the touch operation on the touch position.

It is then found that if a pressure detection is integrated with the touch control, it is possible to further identify touch pressure information (such as pressure value, etc.) when a specific touch location is identified. And, some applications based on the touch pressure will bring a better experience to users, especially for a smart phone with increased application scenes, if a function of the touch pressure detection is supported, the smart phone will be more competitive in the market. As a result, the touch detection technology capable of detecting a touch pressure is attracting more and more attention from users and manufacturers of touch control apparatuses.

At present, the touch pressure detection on a touch control apparatus is mainly achieved by additionally adding a pressure detection device to the touch control apparatus with a function of touch position detection. For example, a capacitance pressure sensor and a demodulation circuit corresponding thereto are added between a screen and an middle frame of the touch control apparatus, or a pressure sensitive material is adhered around the protective glass and the border of the touch control apparatus. However, this needs to add relative devices (pressure sensor or pressure sensitive material, etc.), which inevitably increases the cost and the thickness of the whole touch control apparatus, and thus it is disadvantageous for implementing the touch control apparatus in electronic apparatuses which gradually becomes portable and slight.

SUMMARY

The technical problem to be solved by embodiments of the present invention is to realize highly sensitive touch pressure detection by using a conventional touch control position detection structure without increasing the thickness of the touch control apparatus, so as to enhance user experiences.

In order to solve the above technical problem, an embodiment of the present invention provides a touch sensor, the touch sensor comprises a first electrode layer, a rigid insulating layer, a second electrode layer, a compressible layer and a third electrode layer disposed successively, wherein the compressible layer changes a distance between the second electrode layer and the third electrode layer when being subjected to a touch pressure; the first electrode layer alone is used as a touch sensing component, or forms a touch sensing component together with the second electrode layer; the second electrode layer and the third electrode layer may form a capacitor structure, and the capacitance value of the capacitor structure varies with the deformation amount of the compressible layer.

An embodiment of the present invention also provides a touch detection device, which comprises a touch sensor as described above; a driving circuit configured to drive the first electrode layer, the second electrode layer, and the third electrode layer; and a touch pressure detection unit configured to calculate pressure information of a user's touch operation from the detected change in the capacitance value of the capacitor structure.

An Embodiment of the present invention also provides a touch control apparatus having a built-in touch detection device as described above.

Embodiments of the present invention also provide a detection method for a touch detection device, wherein the touch detection device is the touch detection device as described above; the detection method includes:
  a second driving step of driving the first electrode layer, the second electrode layer and the third electrode layer with a second set of driving signals when a touch operation is performed;
  a second capacitance value detection step of detecting the capacitor structure when a touch operation is performed to obtain a first capacitance value; and
  a touch pressure calculation step of calculating the pressure information of the user's touch operation from the difference between a first capacitance value of the capacitor structure obtained when no touch operation is performed and the second capacitance value.

In embodiments of the present invention, since the pressure of the user's touch operation can be transferred to the third electrode layer through the compressible layer, the capacitance value between the second electrode layer and the third electrode layer is changed, therefore, when the touch pressure is detected, the pressure information of the user's touch operation can be calculated from the change in the capacitance value. In practice, all electrode layers can completely multiplex some parts having an electrode layer which are originally present in the touch control apparatus, it means that highly sensitive touch pressure detection is realized without increasing the thickness and cost of the touch control apparatus, so as to enhance the user experience.

BRIEF DESCRIPTION OF THE DRAWINGS

FIG. 9A is a schematic view showing the design of the electrode pattern of the touch sensing layer in the structure as shown in FIG. 8.

FIG. 9B is a schematic view showing the design of the common electrode pattern on the display driving layer in the structure as shown in FIG. 8.

FIGS. 10A to 10C are schematic views showing detection of the correlative capacitance value when the touch pressure is detected by the structure as shown in FIG. 8.

FIG. 15A is a schematic view showing the design of the electrode pattern of the touch sensing layer in the structure as shown in FIGS. 14A to 14D.

FIG. 15B is a schematic view showing the design of the electrode pattern of the common electrode layer on the display driving layer in the structure as shown in FIGS. 14A to 14D.

FIGS. 16A to 16D are views of a structure in which the touch detection device according to an embodiment of the present invention is applied to a out-off-cell touch control screen apparatus and schematic views showing the detection of the relevant capacitance value when the detection of the touch pressure is performed.

FIG. 17A is a schematic view showing the design of the electrode pattern of the touch sensing layer in the structure as shown in FIGS. 16A to 16D.

FIG. 17B is a schematic view showing the design of the electrode pattern of the common electrode layer on the display driving layer in the structure as shown in FIGS. 16A to 16D.

DETAILED DESCRIPTION

To make the purpose, technical aspects and advantages of the present invention more clear and definite, the present invention will be described in detail with reference to the accompanying drawings.

In a touch control apparatus, the touch sensor for realizing a touch position detection generally includes a first electrode layer and a second electrode layer, and a capacitor structure is formed between the two electrode layers, thus realizing mutual-capacitance detection. In embodiments of the present invention, the touch sensor also includes a third electrode layer separated from the second electrode layer by a compressible layer. The pressure of a user's touch operation can be transferred to the third electrode layer through the compressible layer, and then the capacitance value between the second electrode layer and the third electrode layer is changed accordingly. Thus, when the detection of the touch pressure is performed, the pressure information of the user's touch operation can be calculated from the change in the capacitance value.

Figure 1:
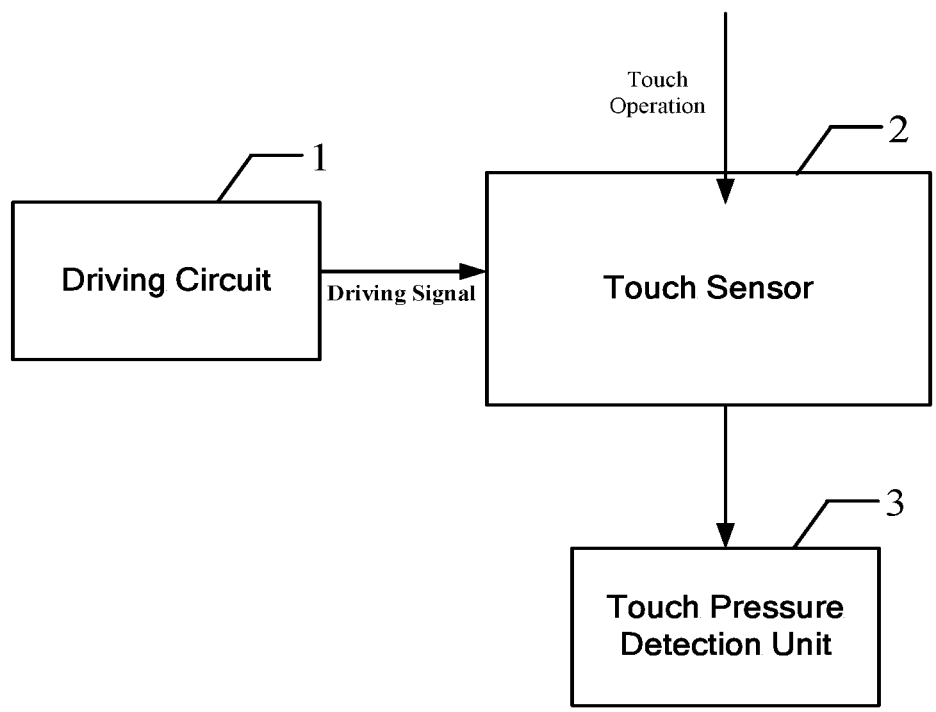
FIG. 1 is a schematic view of a touch detection device provided by an embodiment of the present invention.

Based on the above principle, the touch detection device provided by embodiments of the present invention includes a driving circuit 1, a touch sensor 2 and a touch pressure detection unit 3, as shown in FIG. 1. The touch detection device may be built in an apparatus which requires having a touch control and pressure detection function, such as a smart phone, a tablet computer, a computer touch panel, etc.

Figure 2:
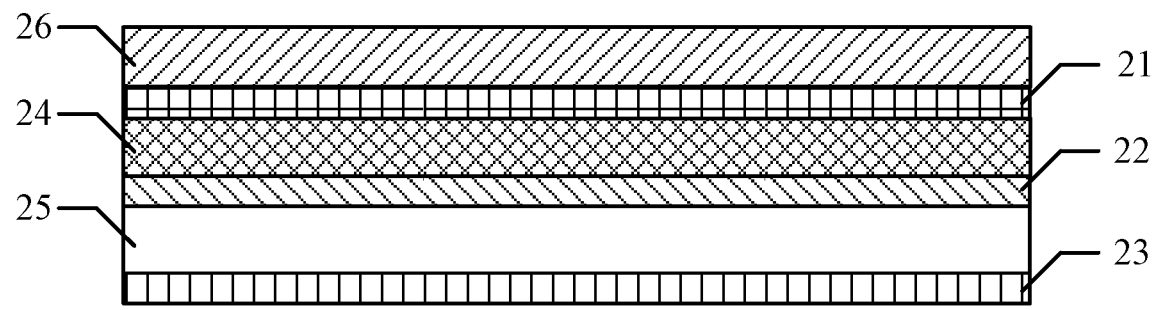
FIG. 2 is a schematic structural view of the touch sensor in FIG. 1.

FIG. 2 shows the structure of the above touch sensor 2, the touch sensor 2 comprises a first electrode layer 21, a second electrode layer 22 and a third electrode layer 23, and a rigid insulating layer 24 is provided between the first electrode layer 21 and the second electrode layer 22 and is configured to separate the first electrode layer 21 from the second electrode layer 22 with a fixed distance, and a compressible layer 25 is provided between the second electrode layer 22 and the third electrode layer 23 and has a certain compressibility to sense deformation caused by the user's touch pressure. When subjected to the user's touch pressure, the deformation of the compressible layer 25 will lead to a change in the distance between the second electrode layer 22 and the third electrode layer 23. Further, a protective layer 26 may be provided on the surface of the first electrode layer 21 to protect the first electrode layer 21, thereby preventing the first electrode layer 21 from being damaged by scratches, impacts, etc.

The first electrode layer 21, the second electrode layer 22, and the rigid insulating layer 24 constitute a touch sensing component for detecting the touch position, for example, and when the touch position is detected, the touch sensing component may be achieved by the first electrode layer 21 together with the second electrode layer 22 (e.g., a mutual-capacitance touch sensor); of course, the touch sensing component may also be achieved by the first electrode layer 21 alone (e.g., a self-capacitance touch sensor). The electrode patterns on the first electrode layer 21 and the second electrode layer 22 may be formed in a stripe shape, a vertical bar shape, a matrix shape, a wavy stripes, etc., as shown in FIGS. 3A to 3D. Also, the second electrode layer 22 may be designed without any electrode pattern, and a whole block of electrode as shown in FIG. 3E may be used as the second electrode layer 22.

Figures 3A, 3B, 3C, 3D, 3E:
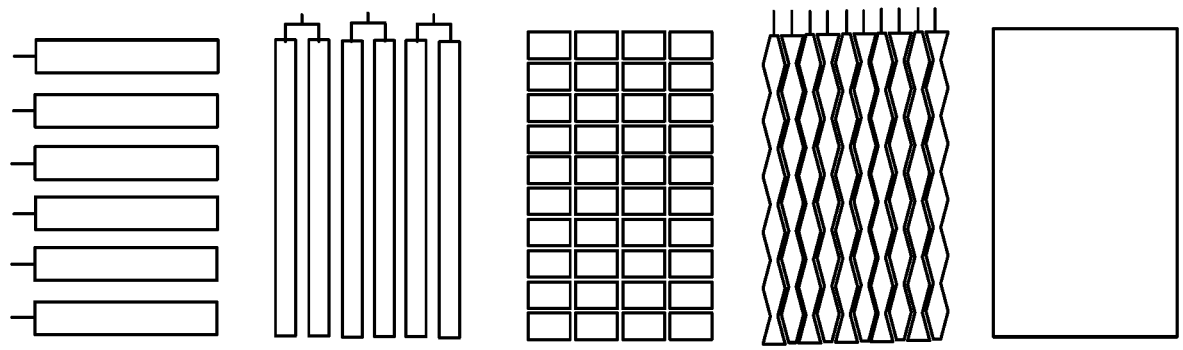
FIGS. 3A to 3E are schematic views showing the design of the electrode pattern of the three electrode layers in FIG. 2.

The whole block of electrode as shown in FIG. 3E may also be used as the third electrode layer 23, or some simple pattern may be designed on the third electrode layer 23, as long as the second electrode layer 22 and the third electrode layer 23 can form a capacitor structure. The compressible layer 25 is deformed by the touch pressure and thus the distance between the first electrode layer 22 and the second electrode layer 23 is changed, therefore, the capacitance value of the capacitor structure formed by the second electrode layer 22 and the third electrode layer 23 may vary with the change of the distance between the second electrode layer 22 and the third electrode layer 23.

Referring to both FIGS. 1 and 2, the driving circuit 1 is configured to drive the first electrode layer 21, the second electrode layer 22, and the third electrode layer 23 in the touch sensor 2.

The touch pressure detection unit 3 is configured to calculate the pressure information of the user's touch operation from the detected change in the capacitance value of the capacitor structure. For convenience of description, the 'capacitance value of the capacitor structure' in the present disclosure refers to the capacitance value of the capacitor structure formed by the second electrode layer 22 and the third electrode layer 23.

As described above, when a touch operation is performed, the above compressible layer 25 is deformed due to force, thus the capacitance value of the capacitor structure changes, and the detection result of the capacitance value of the capacitor structure obtained by the touch pressure detection unit 3 at this time is different from the detection result when no touch operation is performed, therefore, the touch pressure detection unit 3 may calculate the pressure information of the user's touch operation on the touch sensor 2 from the change in the capacitance value of the capacitor structure detected before and after the touch operation.

With reference to FIGS. 1 and 2, the detection of the touch position may be determined by the change in mutual-capacitance between the first electrode layer 21 and the second electrode layer 22 before and after the touch operation (mutual-capacitance detection principle), or may be determined only by the detection of the first electrode layer 21 (self-capacitance detection principle). When the touch pressure detection is performed, the first electrode layer 21 is used as the detection electrode of the whole touch detection device, therefore, it is necessary to detect the first electrode layer 21 to obtain the capacitance value of the above capacitor structure. However, in addition to the above capacitance value of the capacitor structure, the detection result may also include the capacitance value between the first electrode layer 21 and the second electrode layer 22, and when a touch operation is performed, the detection result may even include a capacitance value between the touch finger and the first electrode layer 21. Therefore, in order to calculate the change in the capacitance value of the capacitor structure, it is necessary to remove unnecessary portions included in the detection result before and after the touch operation. Thus, when the detection is performed, it is necessary to control the states of the second electrode layer 22 and the third electrode layer 23 such that the detection result includes necessary information of capacitance value, for example, the driving signal output from the driving circuit 1 to the second electrode layer 22 is at a fixed level, or the second electrode layer 22 is in a suspended state, or the second electrode layer 22 is input with some signal; for example, the driving signal outputted from the driving circuit 1 to the third electrode layer is at a fixed level (which may be a fixed level of zero potential the same as the ground or other potential) or the third electrode layer is in a suspended state, or the third electrode layer is input with some signal.

Specifically, the detection method of the touch detection device as described above according to embodiments of the present invention includes the following steps.

A first driving step: when no touch operation is performed, the first electrode layer, the second electrode layer, and the third electrode layer is driven by a first set of driving signals.

A first capacitance value detection step: when no touch operation is performed, the capacitor structure is detected to obtain a first capacitance value.

A second driving step: when a touch operation is performed, the first electrode layer, the second electrode layer and the third electrode layer is driven with a second set of driving signals.

A second capacitance value detection step: when a touch operation is performed, the capacitor structure is detected to obtain a second capacitance value.

A touch pressure calculation step: the pressure information of the user's touch operation is calculated from the difference between the first capacitance value and the second capacitance value.

Embodiments of the present invention will provide two detection modes to describe the principle of touch pressure detection.

Detection Mode One

In the present detection mode, the first set of driving signals includes a first driving signal and a first fixed level signal for the self-capacitance detection of the first electrode layer; the second set of driving signals includes a second driving signal and a second fixed level signal for the self-capacitance detection of the first electrode layer. The first driving signal and the second driving signal may be a sine wave signal, a square wave signal, etc., and the first fixed level signal and the second fixed level signal may be signals at any fixed level including but not limited to 0V. It is to be noted that in the present Detection Mode One and the subsequent Detection Mode Two, a certain electrode layer being in a "suspended state" means that all the electrodes in the electrode layer are in the suspended state, or means that some electrodes in the electrode layer are in the suspended state.

Figure 4:
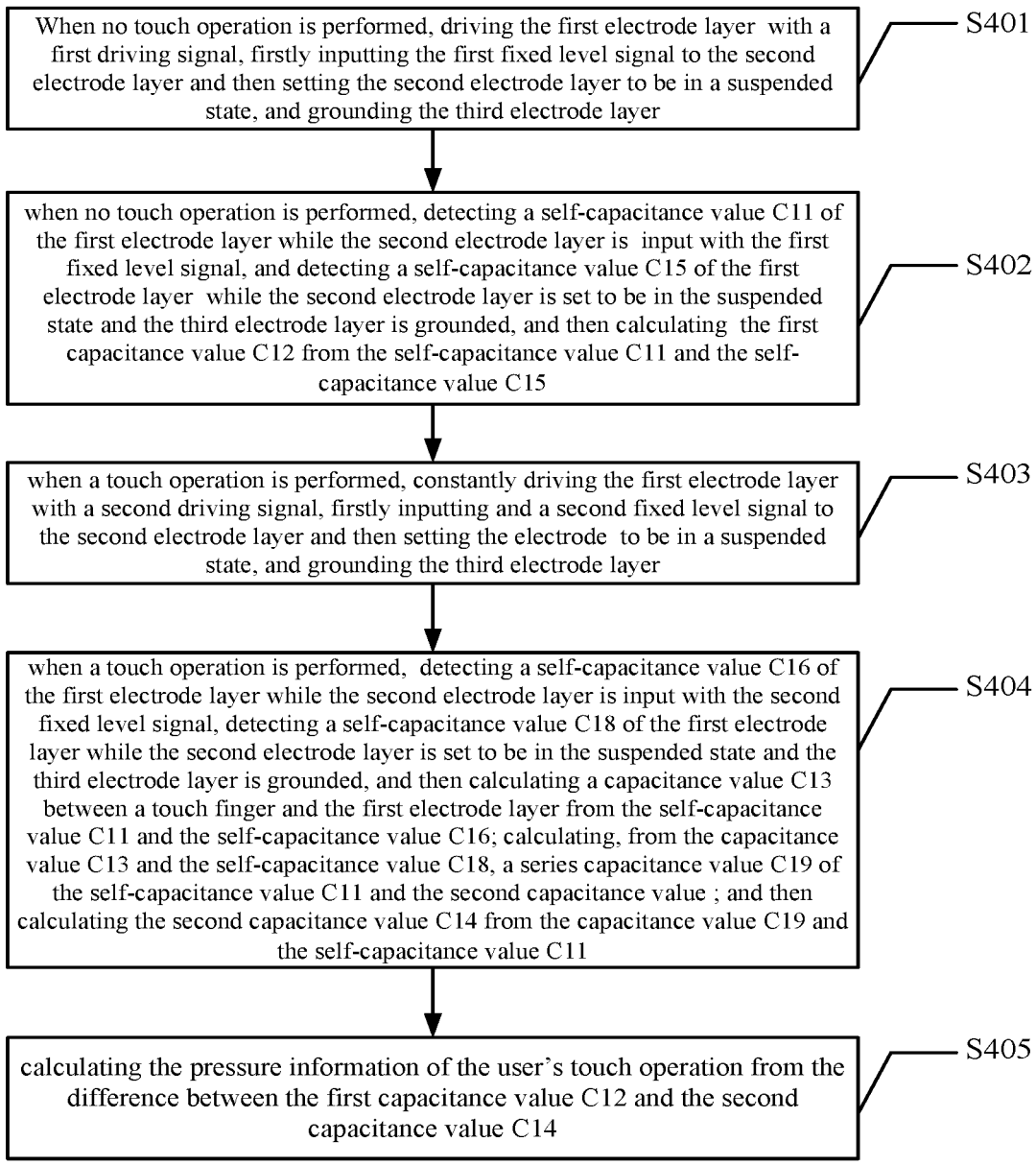
FIG. 4 is a flow chart for a touch pressure detection method provided by an embodiment of the present invention.

Referring to FIG. 4, a touch pressure detection method of the touch detecting device provided by an embodiment of the present invention includes the following steps:

A first driving step S401: when no touch operation is performed, the first electrode layer 21 is constantly driven by the driving circuit 1 with a first driving signal in the first set of driving signals, the second electrode layer 22 is firstly input with a first fixed level signal V and then is set to be in a suspended state, and the third electrode layer 23 is grounded;

A first capacitance value detection step 402: the touch pressure detection unit 3 detects a self-capacitance value C11 of the first electrode layer 21 when the second electrode layer 22 is input with the first fixed level signal V, and detects a self-capacitance value C15 of the first electrode layer 21 when the second electrode layer 22 is set to be in the suspended state and the third electrode layer 23 is grounded; then a first capacitance value C12 is calculated from the self-capacitance value C11 and the self-capacitance value C15.

Figure 5A:
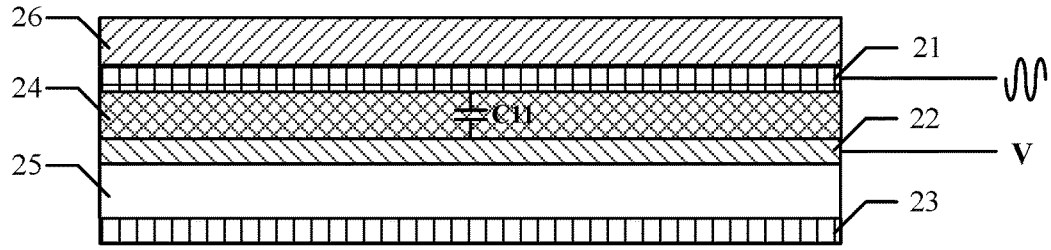
FIGS. 5A to 5D are schematic views showing detection of relevant capacitance values when the detection is performed by using the touch pressure detection method as shown in FIG. 4.

In the present embodiment, the self-capacitance value C11 is the capacitance value between the first electrode layer 21 driven by the first driving signal and the second electrode layer 22 input with the first fixed level signal V, and the detection is shown in FIG. 5A.

Figure 5B:
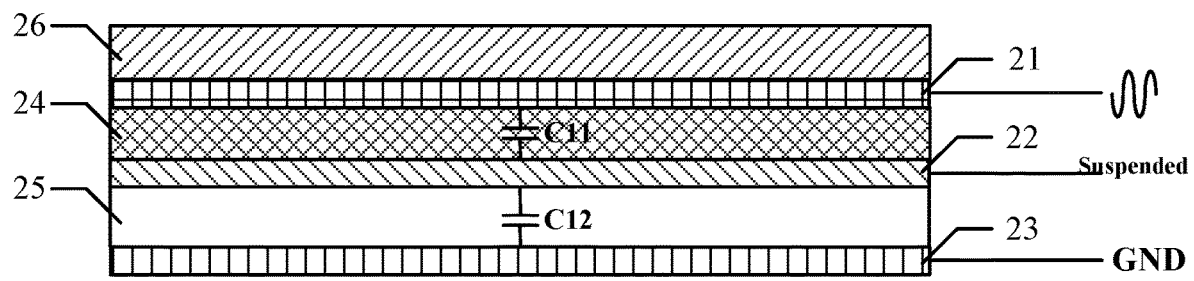

The capacitance value C15 is a series value of the self-capacitance value C11 and the first capacitance value C12, the first capacitance value C12 is the capacitance value between the second electrode layer 22 set to be in a suspended state and the grounded third electrode layer 23, and the detection is shown in FIG. 5B. Therefore, the specific calculation formula for calculating the first capacitance value C12 from the self-capacitance value C11 and the self-capacitance value C15 is: $1/C15=1/C11+1/C12$.

A second driving step S403: the first electrode layer 21 is constantly driven by the driving circuit 1 with a second driving signal, the second electrode layer 22 is firstly input with a second fixed level signal V and then is set to be in a suspended state, and the third electrode layer 23 is grounded.

A second capacitance value detection step S404: when a touch operation is performed, the touch detection unit 3 detects a self-capacitance value C16 of the first electrode layer 21 when the second electrode layer 22 is input with the second fixed level signal V, and detects a self-capacitance value C18 of the first electrode layer 21 when the second electrode layer 22 is set to be in the suspended state and the third electrode layer 23 is grounded. Then, a capacitance value C13 between a touch finger and the first electrode layer 21 is calculated from the self-capacitance value C11 and the self-capacitance value C16; next, a series value C19 of the self-capacitance value C11 and the second capacitance value is calculated from the capacitance value C13 and the self-capacitance value C18; then, the second capacitance value C14 is calculated from the capacitance value C19 and the self-capacitance value C11.

Figure 5C:
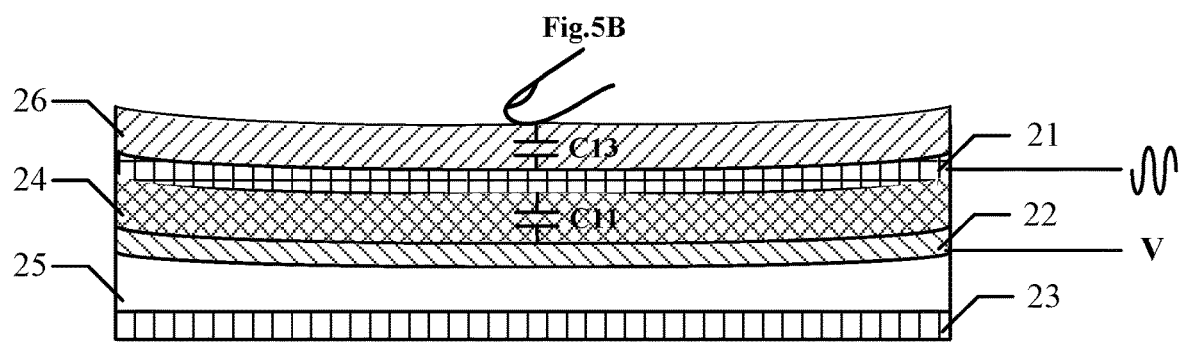

When the second electrode layer 22 is set to be at a fixed level V, the capacitance C11 between the first electrode layer 21 and the second electrode layer 22 remains unchanged, as the rigid insulating layers 24 is provided between the first electrode layer 21 and the second electrode layer 22. The detected self-capacitance value C16 of the first electrode layer 21 is the sum of the capacitance value C13 added due to a finger of the human body and the self-capacitance value C11, and the detection is shown in FIG. 5C.

Figure 5D:
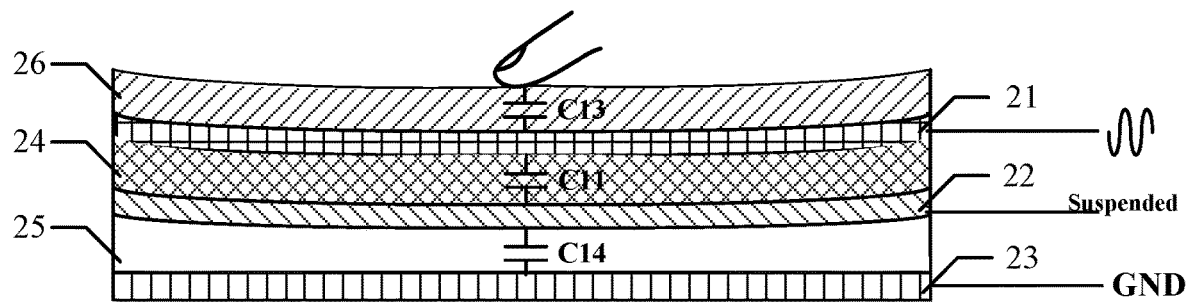

When the second electrode layer 22 is set to be in a suspended state and the third electrode layer 23 is grounded, as the compressible layer 25 is provided between the second electrode layer 22 and the third electrode layer 23, the distance between the second electrode layer 22 and the third electrode layer 23 will be reduced by the pressure of touch operation, and the capacitance value C14 between the second electrode layer 22 and the third electrode layer 23 will be increased. The detected self-capacitance value C18 of the first electrode layer 21 is the sum of the capacitance value C13 added due to a finger of the human body and the capacitance value C19, and the capacitance value C19 is a series value of the self-capacitance value C11 and the capacitance value C14, and the detection is shown in FIG. 5D.

A touch pressure calculation step S405: the touch pressure detection unit 3 calculates the pressure information of the user's touch operation from the difference between the first capacitance value C12 and the second capacitance value C14.

As an embodiment of the present invention, a conversion formula between the change amount of the capacitance value and the magnitude of touch pressure may be obtained in advance by training, and a conversion may be performed directly from the conversion formula each time. As another embodiment of the present invention, a mapping table between the change amount of the capacitance value and the magnitude of touch pressure may be created in advance, and when the change amount between the first capacitance value C12 and the second capacitance value C14 is obtained, the specific touch pressure may be obtained directly by looking up the mapping table.

Detection Mode Two

In the present detection mode, the first set of driving signals includes a third driving signal for self-capacitance detection of the first electrode layer; and the second set of driving signals includes a fourth driving signal for self-capacitance detection of the first electrode layer. Similarly, the third driving signal and the fourth driving signal can also be a sine wave signal, a square wave signal, etc.

Figure 6:
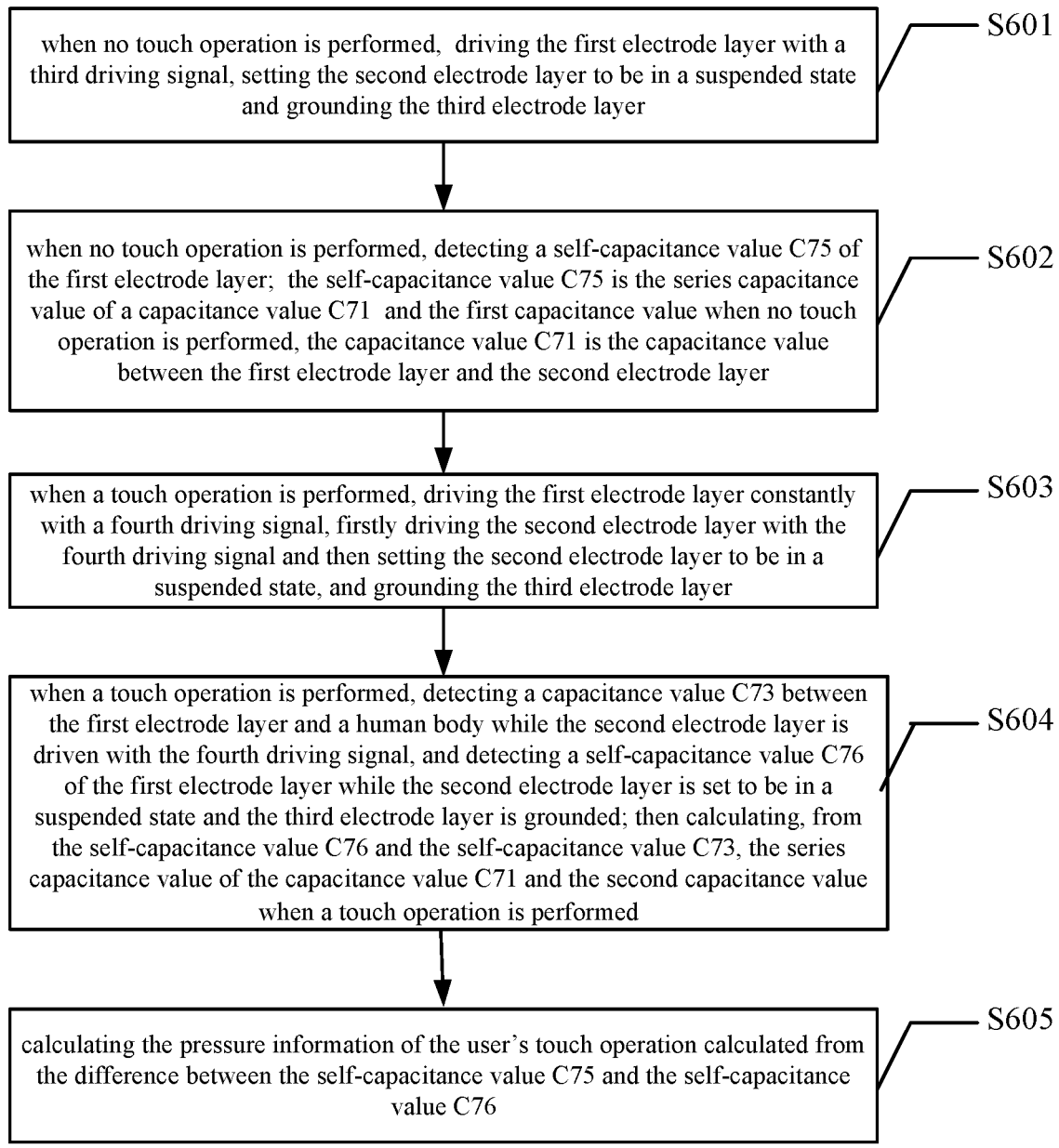
FIG. 6 is a flow chart for another touch pressure detection method provided by an embodiment of the present invention.

Referring to FIG. 6, a touch pressure detection method provided by an embodiment of the present invention includes the following steps.

A first driving step S601: when no touch operation is performed, the first electrode layer 21 is driven by the driving circuit 1 with the third driving signal, the second electrode layer 22 is set to be in a suspended state and the third electrode layer is grounded.

A first capacitance value detection step S602: when no touch operation is performed, a self-capacitance value C75 of the first electrode layer 21 is detected by the touch detection unit 3.

Figure 7A:
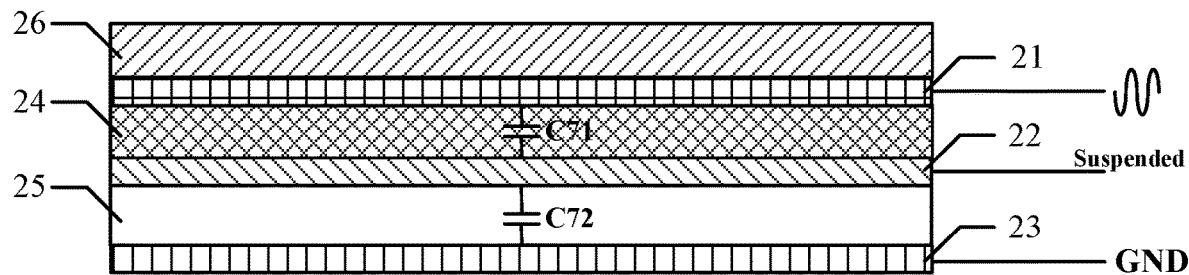
FIGS. 7A to 7C are schematic views showing detection of relevant capacitance values when the detection is performed by using the touch pressure detection method as shown in FIG. 6.

Referring to FIG. 7A, the self-capacitance value C75 detected at this time is a series value of a self-capacitance value C71 and a first capacitance value C72, wherein the self-capacitance value C71 is a capacitance value between the first electrode layer 21 and the second electrode layer 22, and the first capacitance value C72 is a capacitance value between the second electrode layer 22 and the third electrode layer 23 when no touch operation is performed.

A second driving step S603: when a touch operation is performed, the first electrode layer 21 is constantly driven by the driving circuit 1 with a fourth driving signal, and the second electrode layer 22 is firstly driven with the fourth driving signal, then the second electrode layer 22 is set to be in a suspended state and the third electrode layer 23 is grounded.

A second capacitance value detection step S604: when a touch operation is performed, the touch detection unit 3 inputs the same driving signal to the first electrode layer 21 and the second electrode layer 22 and detects a capacitance value C73 between the first electrode layer 32 and the human body. Then, the touch detection unit 3 detects a self-capacitance value C76 of the first electrode layer 21 when the second electrode layer 22 is set to be in a suspended state and the third electrode layer 23 is grounded; next, the series value of the capacitance value C71 and the second capacitance value C74 when a touch operation is performed, is calculated from the self-capacitance value C76 and the self-capacitance value C73.

Figure 7B:
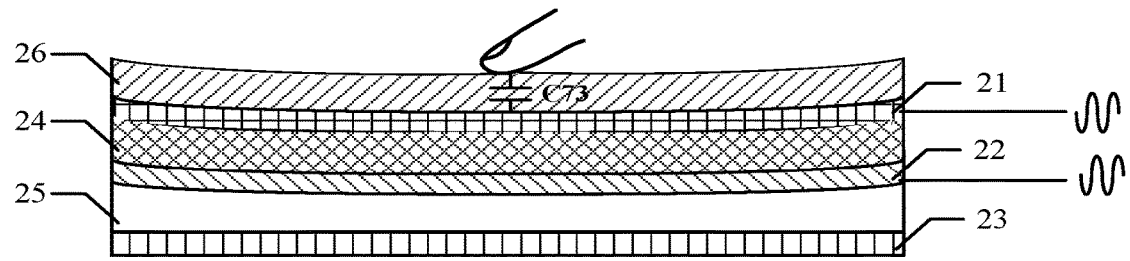

Since the driving signals of the first electrode layer 21 and the second electrode layer 22 are the same, the capacitance value C71 between the first electrode layer 21 and the second electrode layer 22 cannot be detected at this time, and the detection is shown in FIG. 7B.

Figure 7C:
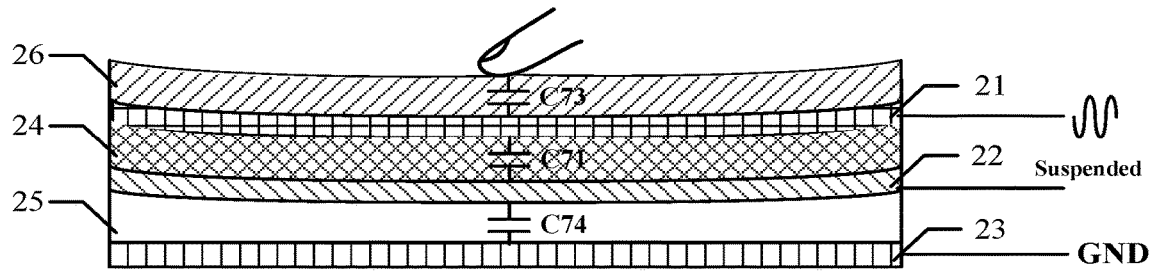

The second capacitance value C74 is the capacitance value between the second electrode layer 22 and the third electrode layer 23 when a touch operation is performed, and the detection is shown in FIG. 7C.

A touch pressure calculation step S605: the touch detection unit 3 calculates the pressure information of the user's touch operation from the difference between the self-capacitance value C75 and the self-capacitance value C76.

As can be seen from the above, since the pressure of the user's touch operation may be transferred to the third electrode layer through the compressible layer, a change of the capacitance value between the second electrode layer and the third electrode layer is thus occurred. Therefore, when the touch pressure detection is performed, the pressure information of the user's touch operation may be calculated from the change of the capacitance value. In implementation, all electrode layers may completely multiplex some parts having an electrode layer which are originally present in the touch control apparatus, which means the cost is not increased. Hereinafter, the multiplexing of the third electrode layer 23 when the above-described touch detection device is applied to some kind of touch control apparatus will be described with reference to several embodiments.

Embodiment 1

Figure 8:
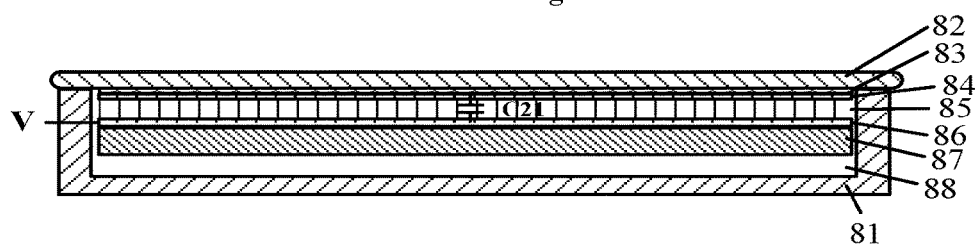
FIG. 8 is a view of a structure in which the touch detection device provided by an embodiment of the present invention is applied to a Hybrid In Cell touch control screen apparatus.
Figure 10C:
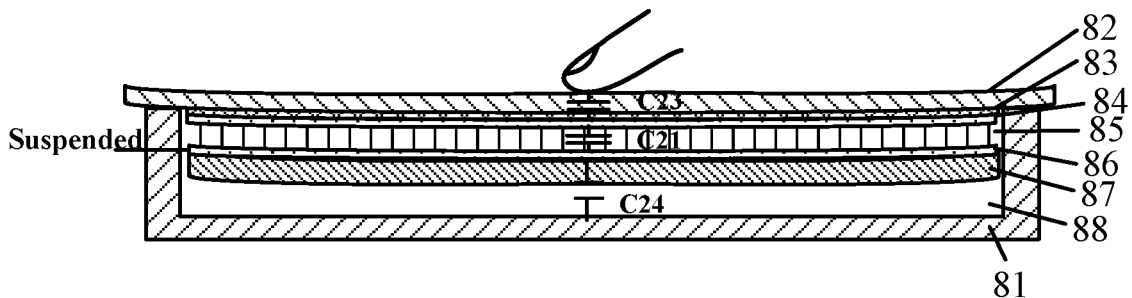
Figure 11:
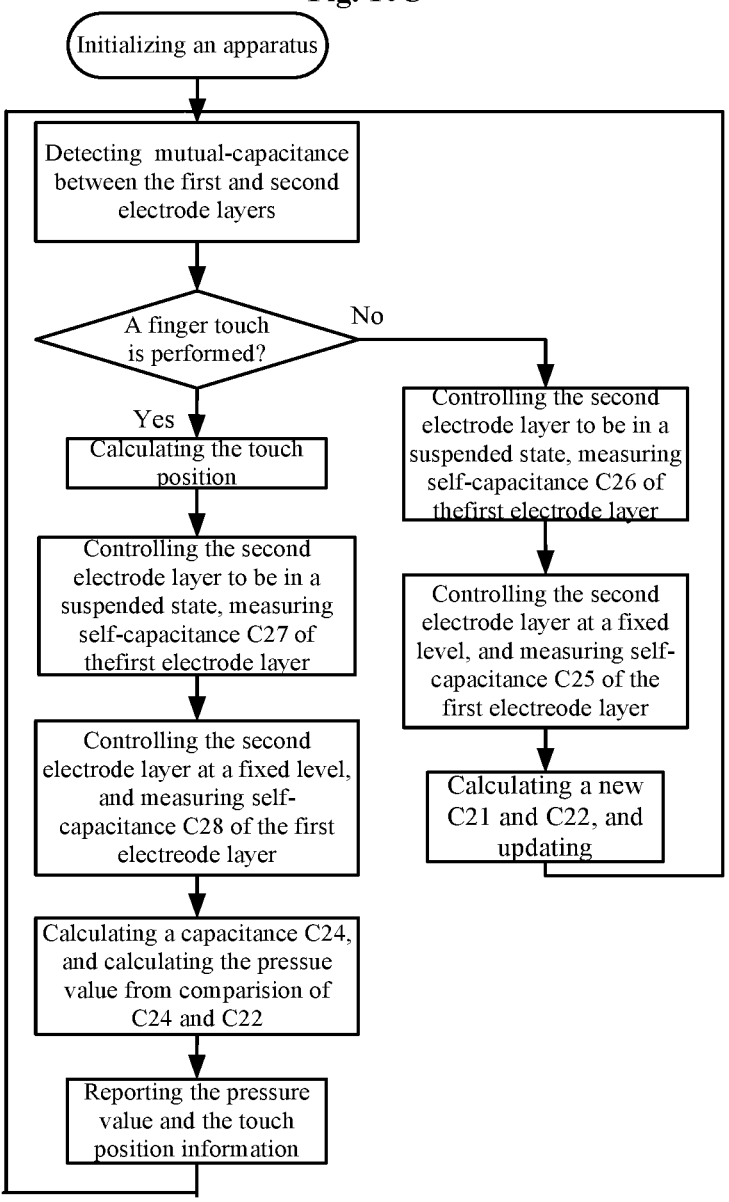
FIG. 11 is a flow chart showing that the touch pressure is detected by the structure as shown in FIG. 8.
Figure 12A:
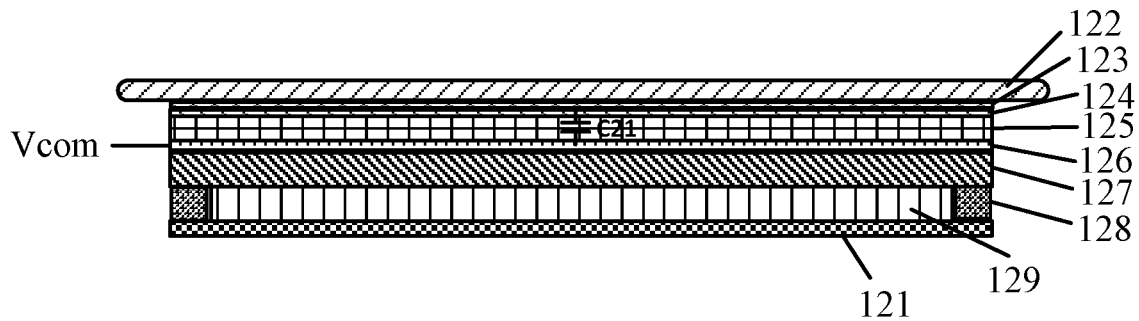
FIGS. 12A to 12D are views of another structure in which the touch detection device provided by an embodiment of the present invention is applied to a Hybrid In Cell touch control screen apparatus and schematic views showing detection of the relevant capacitance value when the detection of touch pressure is performed.
Figure 12B:
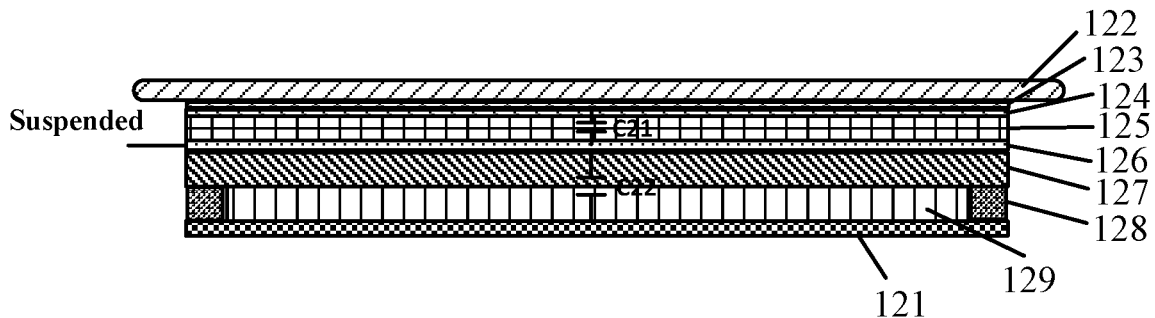
Figure 12C:
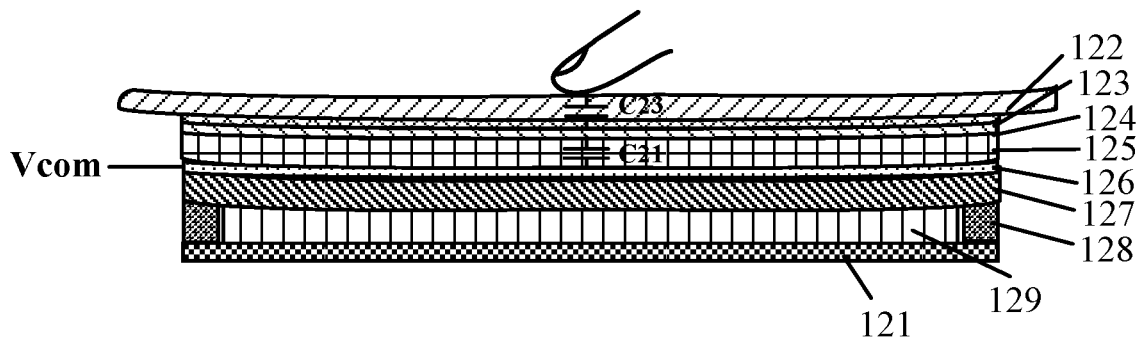
Figure 12D:
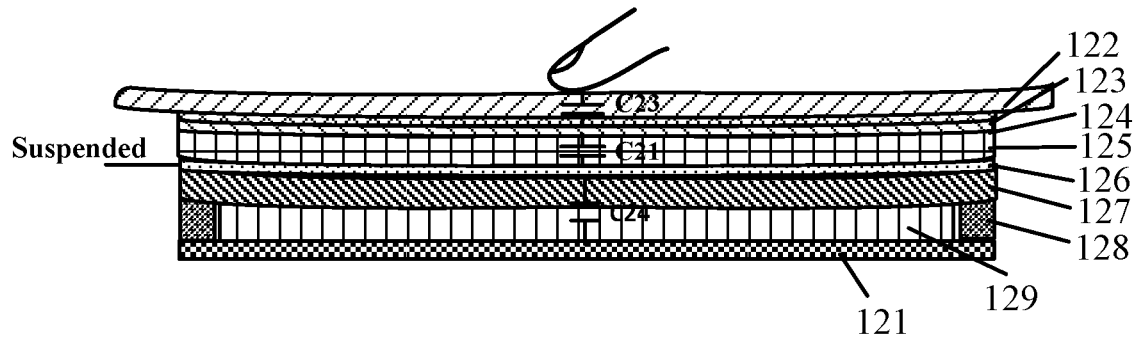
Figure 13A:
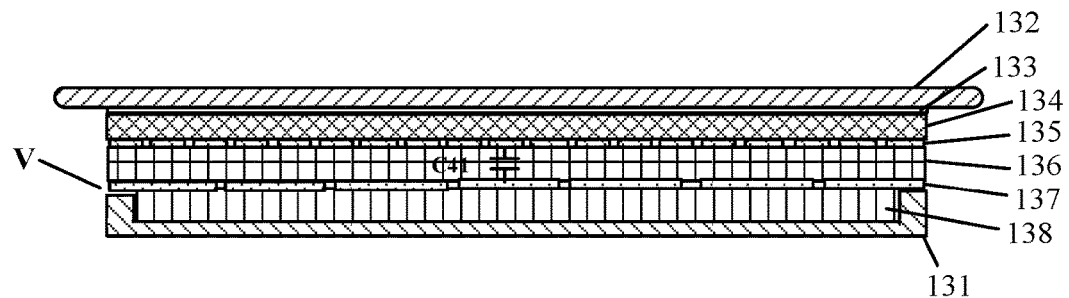
FIGS. 13A to 13D are views of a structure in which the touch detection device provided by an embodiment of the present invention is applied to a full In Cell touch control screen apparatus and schematic views showing the detection of the relevant capacitance value when the detection of the touch pressure is performed.
Figure 13B:
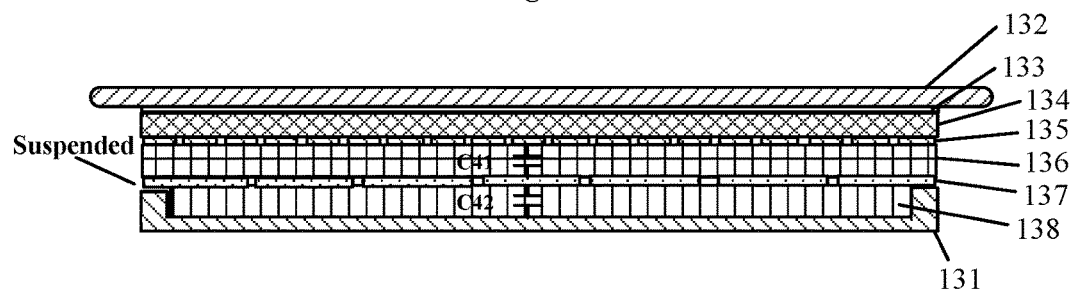
Figure 13C:
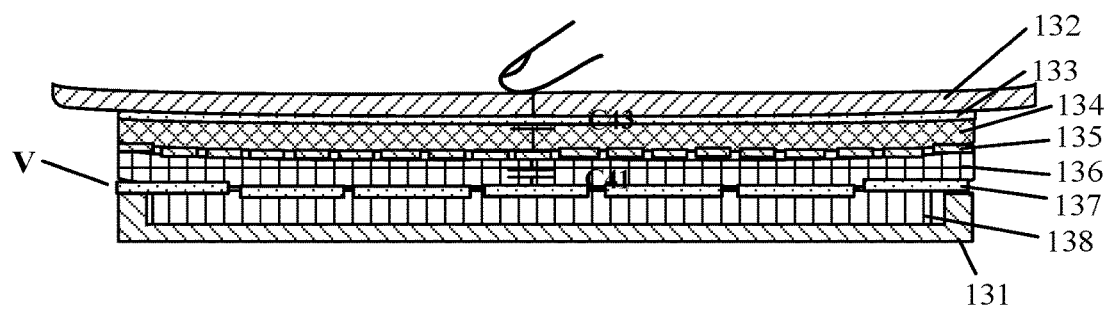
Figure 13D:
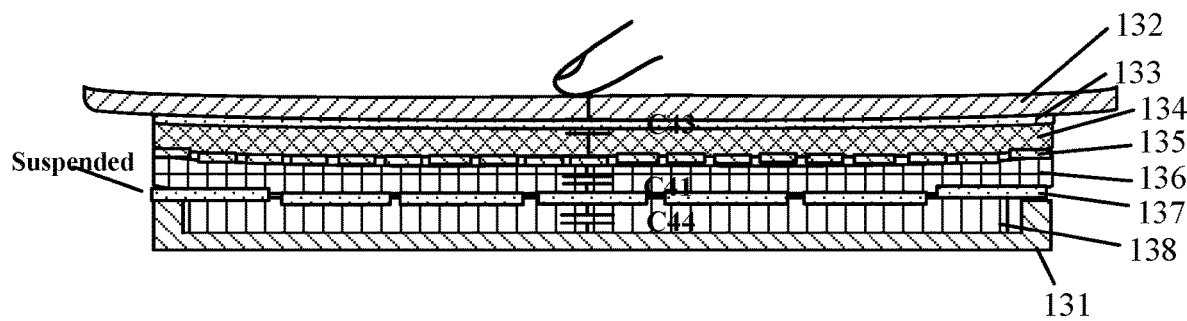
Figure 14A:
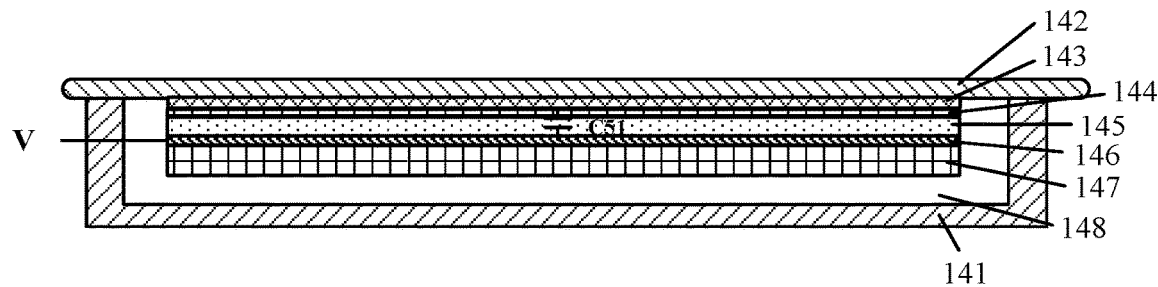
FIGS. 14A to 14D are views of a structure in which the touch detection device provided by an embodiment of the present invention is applied to a full On Cell touch control screen apparatus and schematic views showing the detection of the relevant capacitance value when the detection of the touch pressure is performed.
Figure 14B:
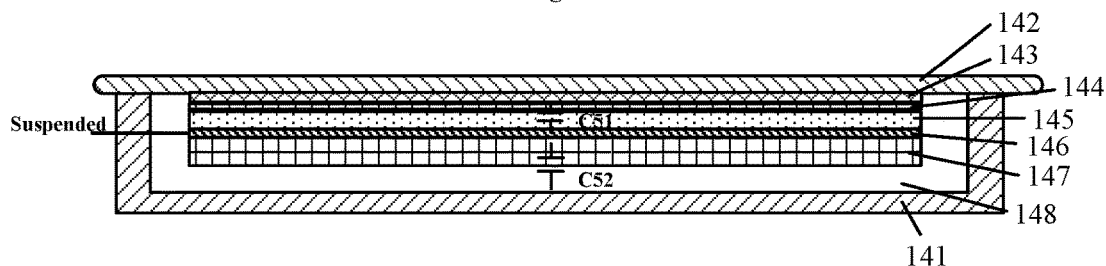
Figure 14C:
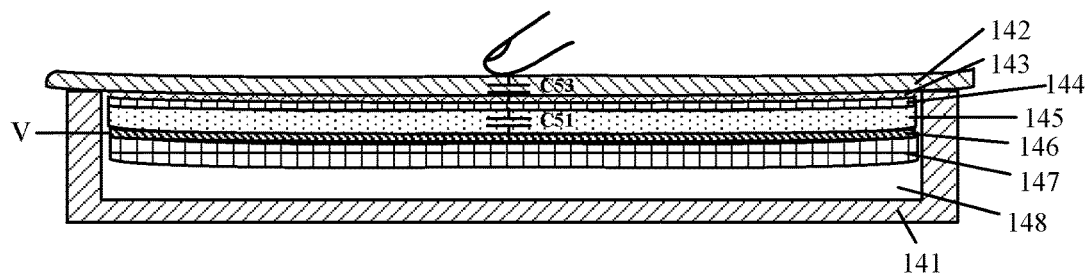
Figure 14D:
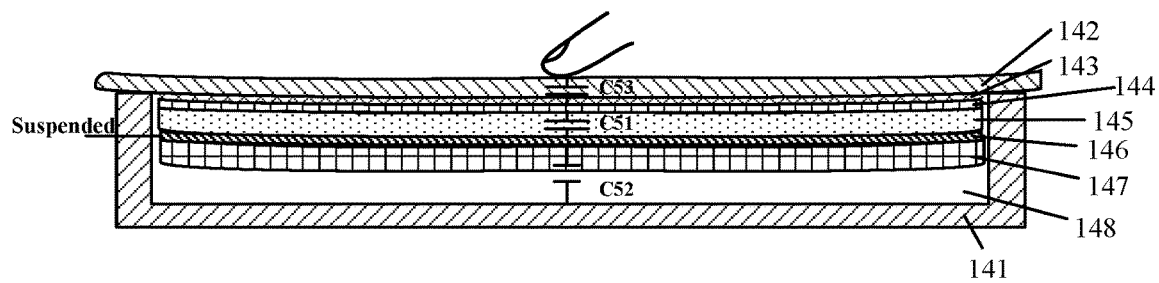

Referring to FIG. 8, a preferred embodiment in which the above-described touch detection device is applied to a Hybrid In Cell touch control screen apparatus is described. As shown in FIG. 8, the specific structure comprises a metal middle frame 81 having a recess, and the surface of the metal middle frame 81 is covered with a tempered glass 82 for protection. An assembly-inside-frame is accommodated within the recess, and the assembly-inside-frame comprises a polarizing sheet 83 of the display screen, a transparent touch sensing layer 84, a CF glass 85, a display driving layer 86 and a TFT glass 87 disposed successively from top to bottom. Under the TFT glass 87 are the other optical components of the display module, such as light guide plates, reflective films, etc. Certain air gap 88 or foam is present between the metal middle frame 81 and the assembly-inside-frame, which is bonded to the tempered glass 82 by glue or frame glue and is normally grounded.

The transparent touch sensing layer 84 is multiplexed as a first electrode layer, the material of which is ITO, and the designed shape design of which is is a double vertical bar as shown in FIG. 9A. The display driving layer 86 is located between the CF glass 85 and the TFT glass 87, and the common electrode layer therein serves as a second electrode layer which is located on the lower surface of the CF glass and can be cut into a shape as shown in FIG. 9B, which forms a touch position sensing component together with the touch sensing layer 84 shown in FIG. 9A. The metal middle frame 81 serves as the third electrode layer. The air gap 88 or foam serves as the compressible layer.

The operation of the first embodiment is further illustrated with reference to FIGS. 10A, 10B, 10C and FIG. 11.

Firstly, the touch control apparatus is initialized, and whether there is a finger touch is determined by comparing the detected mutual-capacitance value between the first and second electrode layers with the original value. If there is no finger touch, the self-capacitance value C21 of the first electrode layer in a fixed-level state and the self-capacitance value C25 of the first electrode layer in a suspended state are detected by setting electrodes of the second electrode layer to be at a fixed level or in a suspended state, as shown in FIGS. 8 and 10A, and then C21 and C22 are calculated, wherein C25 is a series value of C21 and C22. When a finger touch is detected, the position of the touch point is detected by detecting the mutual-capacitance value between the first and second electrode layers, then the second electrode layer is set to be suspended and at a fixed level respectively, and the self-capacitance value C27 of the first electrode layer when the second electrode layer is in a fixed level state and the self-capacitance value C28 of the first electrode layer when the second electrode layer is in a suspended state, are detected. The self-capacitance value C27 is the parallel value of C21 and C22, and the self-capacitance value C28 is the sum value of C23 and the series capacitance value of C21 and C24. Combined with the touch point, the pressure magnitude is obtained by comparing the value of C22 and C24. Wherein, definition of capacitance values C21-C28 is described in the above description.

The advantages of the present embodiment are as follows: 1, it is possible to add a pressure detection to the original configuration of the touch screen of the touch control apparatus, and to enhance the user experience without increasing the cost; 2, the reliability is high and the consistency is good due to the use of the structure of the touch screen itself.

Embodiment 2

Referring to FIGS. 12A, 12B, 12C and 12D, a preferred embodiment in which the above touch detection device is applied to a Hybrid In Cell touch control screen apparatus is described. The specific structure comprises an iron frame or a radiating sheet 121 and a support block 128 disposed on the iron frame or the radiating sheet 121, the structure further comprises a tempered glass 122 for protecting the display screen, a polarizing sheet 123, a touch sensing layer 124, a CF glass 125, a display driving layer 126, a TFT glass 127, and the compressible layer 129 disposed successively from top to bottom, the TFT glass 127 is placed on the support block 128, and the compressible layer 129 is located in a space surrounded by the support block 128, the TFT glass 127, and the iron frame or the radiating sheet 121. Other optical components of the screen are disposed behind the TFT glass 127.

In the present embodiment, the touch sensing layer 124 serves as a first electrode layer, the material of which is ITO, and the structure of which is a double vertical bar as shown in FIG. 9A. The common electrode layer in the display driving layer 126 is used as a second electrode layer and can be cut into a shape as shown in FIG. 9B. The support block 128 is a frame adhesive. The third electrode layer is a conductive iron frame or a radiating sheet 121, which is normally grounded. The detection method is the same as that of the first embodiment and will not be described in detail again.

Embodiment 3

FIGS. 13A, 13B, 13C and 13D show a preferred embodiment in which the above touch detection device is applied to a Full In-cell touch control screen apparatus. Referring to FIGS. 13A to 13D, the specific structure comprises a iron frame 131, and a glass 132 for protecting the screen, a polarizing sheet 133, a CF glass 134, a touch sensing layer 135, a TFT glass 136, a display driving layer 137 having a shielding function and the compressible layer 138 successively covering the iron frame 131 from top to bottom; the iron frame 131 has a recess, and the compressible layer 138 is placed in the recess.

The touch sensing layer 135 is used as the first electrode layer, the material of which is ITO, etc., the specific structure of which is a rectangular lattice pattern as shown in FIG. 3C, the operation mode of which is self-capacitance detection, and the touch sensing layer 135 is located between the CF glass 134 of the display screen and the TFT glass 136. The common electrode layer having a shielding function in the display driving layer 137 serves as a third electrode layer, the specific structure of which has a rectangular shape as shown in FIG. 3C, and the state of which may be set to be suspended or at a fixed level.

Embodiment 4

FIGS. 14A, 14B, 14C and 14D show a preferred embodiment in which the above touch detection device is applied to an on-cell touch control screen apparatus. Referring to FIGS. 14A to 14D, the specific structure comprises a metal middle frame 141, the surface of which is covered with a tempered glass 142 for protection. The metal middle frame 141 has a recess in which an assembly-inside-frame is accommodated, and the assembly-inside-frame comprises a polarizing sheet 143, a touch sensing layer 144, a CF glass 145, a display driving layer 146 and a TFT glass 147 disposed successively from top to bottom. Certain air gap 148 is present between the metal middle frame 141 and the assembly-inside-frame.

The touch sensing layer 144 serves as the first electrode layer, the specific electrode pattern design of which is a single-layer triangular pattern as shown in FIG. 15A. A second electrode layer is a common electrode layer on the display driving layer 146, the material of which is ITO, etc., and the specific electrode pattern design of which is a flat plate structure as shown in FIG. 15B. The second electrode layer may be set to be at a fixed level or in a suspended state by a corresponding control circuit. The grounded metal middle frame 141 serves as the third electrode layer. The air gap 148 serves as a compressible layer.

Embodiment 5

FIGS. 16A, 16B, 16C and 16D show a preferred embodiment in which the above touch detection device is applied to an out-off-cell touch control screen apparatus. Referring to FIGS. 16A to 16D, the specific structure comprises a metal middle frame 161 and a tempered glass 162 for protection covering the surface of the metal middle frame 161. The metal middle frame 161 has a recess in which an assembly-inside-frame is accommodated, and the assembly-inside-frame comprises a touch sensing layer 163, a polarizing sheet 164, a CF glass 165, a display driving layer 166 and a TFT glass 167 disposed successively from top to bottom. Other optical components of the display module, such as light guide plates, reflective films, etc., are disposed under the TFT glass 167. Certain air gap 168 presents between the metal middle frame 161 and the assembly-inside-frame, and is bonded to the tempered glass 162 by glue or frame glue and is normally grounded.

The electrode design pattern of the touch sensing layer 163 is a double-layer vertical stripe pattern as shown in FIG. 17A, a thin film is provided between the upper electrode layer and the lower electrode layer, the operation mode thereof is mutual-capacitance, and the upper electrode layer may be multiplexed as the first electrode layer. The common electrode layer on the display driving layer 166 is a second electrode layer, the material of which is ITO, and the specific electrode pattern design of which is a flat plate structure as shown in FIG. 17B, and the common electrode layer may be set to be at a fixed level or in a suspended state by a corresponding control circuit. Of course, the lower electrode layer of the touch sensing layer 163 may also be multiplexed as the second electrode layer. The grounded metal middle frame 161 serves as a third electrode layer.

It is to be understood that the application of the invention is not limited to the above-described examples and may be improved or modified by those skilled in the art in accordance with the above description, all the improvements and modifications shall fall within the scope of the appended claims.

What is claimed is:

1. A touch detection device, comprising:
a touch sensor comprising:
  a first electrode layer, a rigid insulating layer, a second electrode layer, a compressible layer, and a third electrode layer disposed successively,
  wherein: the compressible layer is configured to change a distance between the second electrode layer and the third electrode layer when being subjected to a touch pressure; the first electrode layer, the second electrode layer, the third electrode layer multiplex some parts having an electrode layer which are originally present in a touch control apparatus;
  the first electrode layer is configured to form a touch sensing component alone or form a touch sensing component together with the second electrode layer; and
  the second electrode layer and the third electrode layer form a capacitor structure, and a capacitance value of the capacitor structure varies with the distance between the second electrode layer and the third electrode layer;
a driving circuit configured to drive the first electrode layer, the second electrode layer, and the third electrode layer; and
a touch pressure detector configured to calculate pressure information of a user's touch operation from a detected change of the capacitance value of the capacitor structure;
wherein:
  the driving circuit is configured to drive the first electrode layer, the second electrode layer and the third electrode layer with a first set of driving signals when no touch operation is performed, and drive the first electrode layer, the second electrode layer and the third electrode layer with a second set of driving signals when a touch operation is performed;
  the touch pressure detector is configured to obtain a first capacitance value by detecting a self-capacitance value of the first electrode layer to detect the capacitor structure when no touch operation is performed, obtain a second capacitance value by detecting a self-capacitance value of the first electrode layer to detect the capacitor structure when a touch operation is performed, and then calculate the pressure information of the user's touch operation from the difference between the first capacitance value and the second capacitance value;
wherein:
  the touch pressure detector obtains the first capacitance value by detecting the capacitor structure when no touch operation is performed in a manner of: detecting a self-capacitance value C11 of the first electrode layer while the second electrode layer is input with the first fixed level signal, detecting a self-capacitance value C15 of the first electrode layer while the second electrode layer is set to be in the suspended state and the third electrode layer is grounded, and then calculating the first capacitance value C12 from the self-capacitance value C11 and the self-capacitance value C15;
  the touch pressure detector obtains the second capacitance value by detecting the capacitor structure when a touch operation is performed in a manner of detecting a self-capacitance value C16 of the first electrode layer while the second electrode layer is input with the second fixed level signal, detecting a self-capacitance value C18 of the first electrode layer while the second electrode layer is set to be in the suspended state and the third electrode layer is grounded, and then calculating a capacitance value C13 between a touch finger and the first electrode layer from the self-capacitance value C11 and the self-capacitance value C16; calculating, from the capacitance value C13 and the self-capacitance value C18, a series value C19 of the self-capacitance value C11 and the second capacitance value; and then calculating the second capacitance value C14 from the capacitance value C19 and the self-capacitance value C11;

the touch pressure detector finally calculates the pressure information of the user's touch operation from the difference between the first capacitance value C12 and the second capacitance value C14.

2. The touch detection device according to claim 1, wherein:

the driving circuit drives the first electrode layer, the second electrode layer, and the third electrode layer when no touch operation is performed in a manner of: driving the first electrode layer constantly with a first driving signal, firstly inputting a first fixed level signal to the second electrode layer and then setting the second electrode layer to be in a suspended state, and grounding the third electrode layer;

the driving circuit drives the first electrode layer, the second electrode layer, and the third electrode layer when a touch operation is performed in a manner of: driving the first electrode layer constantly with a second driving signal, firstly inputting a second fixed level signal to the second electrode layer and then setting the second electrode layer to be in a suspended state, and grounding the third electrode layer.

3. The touch detection device according to claim 1, wherein:

the driving circuit drives the first electrode layer, the second electrode layer, and the third electrode layer when no touch operation is performed in a manner of driving the first electrode layer with a third driving signal, setting the second electrode layer to be in a suspended state and grounding the third electrode layer;

the driving circuit drives the first electrode layer, the second electrode layer, and the third electrode layer when a touch operation is performed in a manner of driving the first electrode layer constantly with a fourth driving signal, firstly driving the second electrode layer with the fourth driving signal and then setting the second electrode layer to be in a suspended state, and grounding the third electrode layer.

4. The touch detection device according to claim 1, wherein:

the touch pressure detector obtains the first capacitance value by detecting the capacitor structure when no touch operation is performed in a manner of detecting a self-capacitance value C75 of the first electrode layer; wherein the self-capacitance value C75 is the series value of a capacitance value C71 and the first capacitance value when no touch operation is performed, the capacitance value C71 is the capacitance value between the first electrode layer and the second electrode layer;

the touch pressure detector obtains the second capacitance value by detecting the capacitor structure when a touch operation is performed in a manner of detecting a capacitance value C73 between the first electrode layer and a human body while the second electrode layer is driven with the fourth driving signal, and detecting a self-capacitance value C76 of the first electrode layer while the second electrode layer is set to be in a suspended state and the third electrode layer is grounded; then calculating, from the self-capacitance value C76 and the self-capacitance value C73, the series value of the capacitance value C71 and the second capacitance value when a touch operation is performed; calculating the pressure information of the user's touch operation from the difference between the self-capacitance value C75 and the self-capacitance value C76.

5. A detection method for a touch detection device, wherein the touch detection device is the touch detection device according to claim 1; the detection method comprising:

a second driving step of driving the first electrode layer, the second electrode layer and the third electrode layer with a second set of driving signals when a touch operation is performed;

a second capacitance value detection step of detecting a self-capacitance value of the first electrode layer to detect the capacitor structure when a touch operation is performed to obtain a second capacitance value; and a touch pressure calculation step of calculating the pressure information of the user's touch operation from the difference between a first capacitance value obtained by detecting a self-capacitance value of the first electrode layer to detect the capacitor structure when no touch operation is performed and the second capacitance value.

6. The detection method according to claim 5, wherein the detection method further comprises:

a first driving step of driving the first electrode layer, the second electrode layer, and the third electrode layer with a first set of driving signals when no touch operation is performed; and a first capacitance value detection step of detecting a self-capacitance value of the first electrode layer to detect the capacitor structure when no touch operation is performed to obtain the first capacitance value.

7. The detection method according to claim 6, wherein:

the first driving step comprises: when no touch operation is performed, driving the first electrode layer constantly with a first driving signal, firstly inputting the first fixed level signal to the second electrode layer and then setting the second electrode layer to be in a suspended state, and grounding the third electrode layer;

the second driving step comprises: when a touch operation is performed, driving the first electrode layer constantly driven with a second driving signal, firstly inputting a second fixed level signal to the second electrode layer and then setting the second electrode layer to be in a suspended state, and grounding the third electrode layer.

8. The detection method according to claim 6, wherein:

the first capacitance value detection step comprises: when no touch operation is performed, detecting a self-capacitance value C11 of the first electrode layer while the second electrode layer is input with the first fixed level signal, and detecting a self-capacitance value C15 of the first electrode layer while the second electrode layer is set to be in the suspended state and the third electrode layer is grounded; then calculating a first capacitance value C12 from the self-capacitance value C11 and the self-capacitance value C15;

the second capacitance value detection step comprises:
when a touch operation is performed, detecting a self-capacitance value C16 of the first electrode layer while the second electrode layer is input with the second fixed level signal, and detecting a self-capacitance value C18 of the first electrode layer while the second electrode layer is set to be in the suspended state and the third electrode layer is grounded; then calculating a capacitance value C13 between the touch finger and the first electrode layer from the self-capacitance value C11 and the self-capacitance value C16; and calculating, from the capacitance value C13 and the self-capacitance value C18, a series value C19 of the self-capacitance value C11 and the second capacitance value; and then calculating the second capacitance value C14 from the capacitance value C19 and the self-capacitance value C11;

the touch pressure detection step comprises calculating the pressure information of the user's touch operation from the difference between the first capacitance value C12 and the second capacitance value C14.

9. The detection method according to claim 6, wherein:
the first driving step comprises: when no touch operation is performed, driving the first electrode layer with a third driving signal, setting the second electrode layer to be in a suspended state and grounding the third electrode layer;
the second driving step including: when a touch operation is performed, driving the first electrode layer constantly with a fourth driving signal, firstly driving the second electrode layer with the fourth driving signal and then setting the second electrode layer to be in a suspended state and grounding the third electrode layer.

10. The detection method according to claim 6, wherein:
the first capacitance value detection step comprises: when no touch operation is performed, detecting a self-capacitance value C75 of the first electrode layer; the self-capacitance value C75 is the series value of a capacitance value C71 and the first capacitance value when no touch operation is performed, the capacitance value C71 is the capacitance value between the first electrode layer and the second electrode layer;

the second capacitance value detection step comprises: when a touch operation is performed, detecting a capacitance value C73 between the first electrode layer and a human body while the second electrode layer is driven with the fourth driving signal, and detecting a self-capacitance value C76 of the first electrode layer while the second electrode layer is set to be in a suspended state and the third electrode layer is grounded; then calculating, from the self-capacitance value C76 and the self-capacitance value C73, the series value of the capacitance value C71 and the second capacitance value when a touch operation is performed; and the touch pressure calculation step comprises: calculating the pressure information of the user's touch operation from the difference between the self-capacitance value C75 and the self-capacitance value C76.

11. A touch detection device, comprising:
a touch sensor comprising:
a first electrode layer, a rigid insulating layer, a second electrode layer, a compressible layer, and a third electrode layer disposed successively, wherein: the compressible layer is configured to change a distance between the second electrode layer and the third electrode layer when being subjected to a touch pressure;

the first electrode layer, the second electrode layer, the third electrode layer multiplex some parts having an electrode layer which are originally present in a touch control apparatus;

the first electrode layer is configured to form a touch sensing component alone or form a touch sensing component together with the second electrode layer; and the second electrode layer and the third electrode layer form a capacitor structure, and a capacitance value of the capacitor structure varies with the distance between the second electrode layer and the third electrode layer;

a driving circuit configured to drive the first electrode layer, the second electrode layer, and the third electrode layer; and a touch pressure detector configured to calculate pressure information of a user's touch operation from a detected change of the capacitance value of the capacitor structure;

wherein:
the driving circuit is configured to drive the first electrode layer, the second electrode layer and the third electrode layer with a first set of driving signals when no touch operation is performed, and drive the first electrode layer, the second electrode layer and the third electrode layer with a second set of driving signals when a touch operation is performed;

the touch pressure detector is configured to obtain a first capacitance value by detecting a self-capacitance value of the first electrode layer to detect the capacitor structure when no touch operation is performed, obtain a second capacitance value by detecting a self-capacitance value of the first electrode layer to detect the capacitor structure when a touch operation is performed, and then calculate the pressure information of the user's touch operation from the difference between the first capacitance value and the second capacitance value;

wherein
the touch pressure detector obtains the first capacitance value by detecting the capacitor structure when no touch operation is performed in a manner of detecting a self-capacitance value C75 of the first electrode layer; wherein the self-capacitance value C75 is the series value of a capacitance value C71 and the first capacitance value when no touch operation is performed, the capacitance value C71 is the capacitance value between the first electrode layer and the second electrode layer;

the touch pressure detector obtains the second capacitance value by detecting the capacitor structure when a touch operation is performed in a manner of detecting a capacitance value C73 between the first electrode layer and a human body while the second electrode layer is driven with the fourth driving signal, and detecting a self-capacitance value C76 of the first electrode layer while the second electrode layer is set to be in a suspended state and the third electrode layer is grounded; then calculating, from the self-capacitance value C76 and the self-capacitance value C73, the series value of the capacitance value C71 and the second capacitance value when a touch operation is performed; calculating the pressure information of the user's touch operation from the difference between the self-capacitance value C75 and the self-capacitance value C76.

\* \* \* \* \*